US007962798B2

(12) United States Patent
Locasto et al.

(10) Patent No.: US 7,962,798 B2
(45) Date of Patent: Jun. 14, 2011

(54) METHODS, SYSTEMS AND MEDIA FOR SOFTWARE SELF-HEALING

(75) Inventors: Michael E. Locasto, Miller, NY (US);
Angelos D. Keromytis, New York, NY (US); Salvatore J. Stolfo, Ridgewood, NJ (US); Angelos Stavrou, New York, NY (US); Gabriela Cretu, New York, NY (US); Stylianos Sidiroglou, New York, NY (US); Jason Nieh, New York, NY (US); Oren Laadan, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1041 days.

(21) Appl. No.: 11/785,317

(22) Filed: Apr. 17, 2007

(65) Prior Publication Data
US 2010/0011243 A1 Jan. 14, 2010

Related U.S. Application Data

(60) Provisional application No. 60/792,430, filed on Apr. 17, 2006.

(51) Int. Cl.
*G06F 11/00* (2006.01)
(52) U.S. Cl. .................................................... 714/38.1
(58) Field of Classification Search ............... 714/38, 714/35, 20, 19
See application file for complete search history.

(56) References Cited

U.S. PATENT DOCUMENTS

| 5,948,112 | A | 9/1999 | Shimada et al. | |
| 6,567,937 | B1 | 5/2003 | Flores et al. | |
| 6,874,138 | B1 * | 3/2005 | Ziegler et al. | 717/127 |
| 6,993,760 | B2 * | 1/2006 | Peev et al. | 717/174 |
| 7,114,150 | B2 * | 9/2006 | Dimpsey et al. | 717/131 |
| 7,305,582 | B1 * | 12/2007 | Moser et al. | 714/13 |
| 7,308,607 | B2 * | 12/2007 | Reinhardt et al. | 714/25 |
| 2004/0034814 | A1 * | 2/2004 | Thompson | 714/35 |
| 2005/0034014 | A1 * | 2/2005 | Moser et al. | 714/17 |
| 2005/0050386 | A1 * | 3/2005 | Reinhardt et al. | 714/13 |
| 2005/0055606 | A1 * | 3/2005 | Kutan et al. | 714/15 |
| 2005/0114731 | A1 * | 5/2005 | Lomet et al. | 714/15 |
| 2006/0075306 | A1 | 4/2006 | Chandrasekaran | |
| 2006/0294435 | A1 * | 12/2006 | Vick et al. | 714/38 |
| 2007/0101192 | A1 * | 5/2007 | Kutan et al. | 714/16 |
| 2007/0283433 | A1 * | 12/2007 | Chen et al. | 726/22 |
| 2008/0133975 | A1 * | 6/2008 | Pfeiffer et al. | 714/38 |
| 2009/0327806 | A1 * | 12/2009 | Majumdar et al. | 714/15 |

(Continued)

OTHER PUBLICATIONS

Abadi et al., Control-Flow Integrity, In Proceedings of the 12th ACM Conference on Computer and Communications Security (CCS 2005), pp. 340-353, Sep. 2005.

(Continued)

*Primary Examiner* — Bryce P Bonzo
(74) *Attorney, Agent, or Firm* — Byrne Poh LLP

(57) ABSTRACT

Methods, systems, and media for enabling a software application to recover from a fault condition, and for protecting a software application from a fault condition, are provided. In some embodiments, methods include detecting a fault condition during execution of the software application, restoring execution of the software application to a previous point of execution, the previous point of execution occurring during execution of a first subroutine in the software application, and forcing the first subroutine to forego further execution and return to a caller of the first subroutine.

26 Claims, 6 Drawing Sheets

U.S. PATENT DOCUMENTS

2010/0050176 A1* 2/2010 Vanderpool .................. 718/100
2010/0058108 A1* 3/2010 Nammatsu et al. ............... 714/4

OTHER PUBLICATIONS

Anagnostakis et al., Detecting Targetted Attacks Using Shadow Honeypots, In Proceedings of the 14th USENIX Security Symposium, pp. 129-144, Aug. 2005.
Avijit et al., TIED, LibsafePlus: Tools for Runtime Buffer Overflow Protection, In Proceedings of the 13th USENIX Security Symposium, pp. 45-55, Aug. 2004.
Cadar et al., Execution generated test cases: How to make systems code crash itself, Lecture Notes in Computer Science, vol. 3639, pp. 2-23, 2005.
Candea et al., Recursive restartability: Turning the reboot sledgehammer into a scalpel, In Proceedings of the 8th Workshop on Hot Topics in Operating Systems (HotOS-VIII), pp. 110-115, May 2001.
Candea et al., Crash-only software, In Proceedings of the 9th Workshop on Hot Topics in Operating Systems (HotOS-IX), May 2003.
Cowan et al., FormatGuard: Automatic Protection From printf Format String Vulnerabilities, In Proceedings of the 10th USENIX Security Symposium, pp. 191-199, Aug. 2001.
Cowan et al., StackGuard: Automatic Adaptive Detection and Prevention of Buffer-Overflow Attacks, In Proceedings of the 7th USENIX Security Symposium, Jan. 1998.
Crosby et al., Denial of Service via Algorithmic Complexity Attacks, In Proceedings of the 12th USENIX Security Symposium, pp. 29-44, Aug. 2003.
Demsky et al., Automatic Detection and Repair of Errors in Data Structures, In Proceedings of the 18th Annual ACM SIGPLAN Conference on Object-Oriented Programming, Systems, Languages, and Application (OOPSLA), Oct. 2003.
Godefroid et al., Dart: directed automated random testing, In PLDI '05: Proceedings of the 2005 ACM SIGPLAN conference on Programming language design and implementation, pp. 213-223, 2005.
Kiriansky et al., Secure Execution Via Program Shepherding, In Proceedings of the 11th USENIX Security Symposium, Aug. 2002.
Locasto et al., Software Self-Healing Using Collaborative Application Communities, In Proceedings of the Internet Society (ISOC) Symposium on Network and Distributed Systems Security (SNDSS), Feb. 2006.
Malton et al., Source Transformation in Software Engineering using the TXL Transformation System, Journal of Information and Software Technology, 44:827-837, 2002.
Miller et al., Fuzz revisited: A re-examination of the reliability of UNIX utilities and services, University of Wisconsin, Computer Sciences Department, Technical report, Apr. 11, 1995.
Mosberger et al., httperf: A tool for measuring web server performance, In First Workshop on Internet Server Performance, pp. 59-67, Jun. 1998.
Necula et al., CCured: Type-Safe Retrofitting of Legacy Code, In Proceedings of the Principles of Programming Languages (PoPL), Jan. 2002.
Rinard, Acceptability-oriented computing, In Proceedings of the 18th Annual ACM SIGPLAN Conference on Object-Oriented Programming, Systems, Languages, and Application (OOPSLA), Oct. 2003.
Rudys et al., Transactional Rollback for Language-Based Systems, In ISOC Symposium on Network and Distributed Systems Security (SNDSS), Feb. 2001.
Rudys et al., Termination in Language-based Systems, ACM Transactions on Information and System Security, 5(2), May 2002.
Sengupta et al., Software Fault Tolerance for Low-to-Moderate Radiation Environments, In ASP Conf. Ser., vol. 238, Astronomical Data Analysis Software and Systems X, 2001.
Shankar et al., Detecting Format String Vulnerabilities with Type Qualifiers, In Proceedings of the 10th USENIX Security Symposium, pp. 201-216, Aug. 2001.
Sidiroglou et al., A Dynamic Mechanism for Recovery from Buffer Overflow attacks, In Proceedings of the 8th Information Security Conference (ISC), Sep. 2005.
Sidiroglou et al., A Network Worm Vaccine Architecture, In Proceedings of the IEEE Workshop on Enterprise Technologies: Infrastructure for Collaborative Enterprises (WETICE), Workshop on Enterprise Security, pp. 220-225, Jun. 2003.
Srivastave et al., Atom: a system for building customized program analysis tools, In PLDI '94: Proceedings of the ACM SIGPLAN 1994 Conference on Programming Language Design and Implementation, pp. 196-206, 1994.
Wang et al., Y-Branches: When You Come to a Fork in the Road, Take It, In Proceedings of the 12th International Conference on Parallel Architectures and Compilation Techniques, Sep. 2003.
International Search Report and Written Opinion of the International Searching Authority, International Patent Application No. PCT/US2007/012784, Jul. 14, 2008.
Bhatkar, S., Chaturvedi, A., and Sekar., R., Dataflow Anomaly Detection, In Proceedings of the IEEE Symposium on Security and Privacy, 2006.
Buck, B., and Hollingsworth, J. K., An API for Runtime Code Patching, The International Journal of High Performance Computing Applications, 14, 4 (Winter 2000), pp. 317-329.
Bui, L., Hershkop, S., and Stolfo, S., Unsupervised Anomaly Detection in Computer Security and an Application to File System Access, In Proceedings of ISMIS, 2005.
Chari, S. N., and Cheng, P.-C., BlueBoX: A Policy-driven, Host-Based Intrusion Detection System, In Proceedings of the 9th Symposium on Network and Distributed Systems Security (NDSS 2002).
Chen, S., Xu, J., Sezer, E. C., Gauriar, P., and Iyer, R. K., Non-Control-Data Attacks Are Realistic Threats, In Proceedings of the 14th USENIX Security Symposium, Aug. 2005, pp. 177-191.
Costa, M., Crowcroft, J., Castro, M., and Rowstron, A., Vigilante: End-to-End Containment of Internet Worms, In Proceedings of the Symposium on Systems and Operating Systems Principles (SOSP 2005).
Eskin, E., Lee, W., and Stolfo, S. J., Modeling System Calls for Intrusion Detection with Dynamic Window Sizes, In Proceedings of DARPA Information Survivabilty Conference and Exposition II (DISCEX II), Jun. 2001.
Feng, H. H., Kolesnikov, O., Fogla, P., Lee, W., and Gong, W., Anomaly Detection Using Call Stack Information, In Proceedings of the 2003 IEEE Symposium on Security and Privacy, May 2003.
Gao, D., Reiter, M. K., and Song, D., Gray-Box Extraction of Execution Graphs for Anomaly Detection, In Proceedings of the ACM Conference on Computer and Communications Security (CCS), 2004.
Gao, D., Reiter, M. K., and Song, D., Behavioral Distance for Intrusion Detection. In Proceedings of the 8th International Symposium on Recent Advances in Intrusion Detection (RAID), Sep. 2005, pp. 63-81.
Giffin, J. T., Dagon, D., Jha, S., Lee, W., and Miller, B. P., Environment-Sensitive Intrusion Detection. In Proceedings of the 8th International Symposium on Recent Advances in Intrusion Detection (RAID), Sep. 2005.
Handley, M., Paxson, V., and Kreibich, C., Network Intrusion Detection: Evasion, Traffic Normalization, and End-to-End Protocol Semantics, In Proceedings of the USENIX Security Conference, 2001.
Hofmeyr, S. A., Somayaji, A., and Forrest, S., Intrusion Detection System Using Sequences of System Calls. Journal of Computer Security 6, 3 (1998), pp. 151-180.
Lam, L. C., and Cker Chiueh, T., Automatic Extraction of Accurate Application-Specific Sandboxing Policy, In Proceedings of the 7th International Symposium on Recent Advances in Intrusion Detection, Sep. 2004.
Liang, Z., and Sekar, R., Fast and Automated Generation of Attack Signatures: A Basis for Building Self-Protecting Servers, In Proceedings of the 12th ACM Conference on Computer and Communications Security (CCS), Nov. 2005.
Locasto, M. E. and Keromytis, A. D., Binary Level Function Profiling for Intrusion Detection and Smart Error Virtualization, Technical Report CUCS-002-07, Columbia University, 2006.
Luk, C.-K., Cohn, R., Muth, R., Patil, H., Klauser, A., Lowney, G., Wallace, S., Reddi, V. J., and Hazelwood., K., Pin: Building Customized Program Analysis Tools with Dynamic Instrumentation, In Proceedings of Programming Language Design and Implementation (PLDI), Jun. 2005.

Nethercote, N., and Seward, J., Valgrind: A Program Supervision Framework, In Electronic Notes in Theoretical Computer Science (2003), vol. 89.

Newsome, J., Brumley, D., and Song, D., Vulnerability-Specific Execution Filtering for Exploit Prevention on Commodity Software, In Proceedings of the 13th Symposium on Network and Distributed System Security (NDSS 2006), Feb. 2006.

Newsome, J., and Song, D., Dynamic Taint Analysis for Automatic Detection, Analysis, and Signature Generation of Exploits on Commodity Software, In Proceedings of the 12th Annual Network and Distributed System Security Symposium, Feb. 2005.

Osman, S., Subhraveti, D., Su, G., and Nieh, J., The Design and Implementation of Zap: A System for Migrating Computing Environments, In Proceedings of the 5th Symposium on Operating Systems Design and Implementation (OSDI 2002), Dec. 2002, pp. 361-376.

Provos, N., Improving Host Security with System Call Policies, In Proceedings of the 12th USENIX Security Symposium, Aug. 2003, pp. 207-225.

Qin, F., Tucek, J., Sundaresan, J., and Zhou, Y., Rx: Treating Bugs as Allergies—A Safe Method to Survive Software Failures, In Proceedings of the Symposium on Systems and Operating Systems Principles (SOSP 2005).

Rinard, M., Cadar, C., Dumitran, D., Roy, D., and Leu, T., A Dynamic Technique for Eliminating Buffer Overflow Vulnerabilities (and Other Memory Errors), In Proceedings 20th Annual Computer Security Applications Conference (ACSAC), Dec. 2004.

Rinard, M., Cadar, C., Dumitran, D., Roy, D., Leu, T., and W Beebee, J., Enhancing Server Availability and Security Through Failure-Oblivious Computing, In Proceedings 6th Symposium on Operating Systems Design and Implementation (OSDI), Dec. 2004.

Sidiroglou, S., Locasto, M. E., Boyd, S. W., and Keromytis, A. D., Building a Reactive Immune System for Software Services, In Proceedings of the USENIX Annual Technical Conference, Apr. 2005, pp. 149-161.

Smirnov, A., and Chiueh, T., DIRA: Automatic Detection, Identification, and Repair of Control-Hijacking Attacks, In The 12th Annual Network and Distributed System Security Symposium, Feb. 2005.

Somayaji, A., and Forrest, S., Automated Response Using System-Call Delays, In Proceedings of the 9th USENIX Security Symposium, Aug. 2000.

Stolfo, S. J., Apap, F., Eskin, E., Heller, K., Hershkop, S., Honig, A., and Svore, K., A Comparative Evaluation of Two Algorithms for Windows Registry Anomaly Detection, Journal of Computer Security 13, 4 (2005).

Wagner, D., and Soto, P., Mimicry Attacks on Host-Based Intrusion Detection Systems, In Proceedings of the ACM Conference on Computer and Communications Security (CCS), 2002.

Wang, H. J., Guo, C., Simon, D. R., and Zugenmaier, A., Shield: Vulnerability-Driven Network Filters for Preventing Known Vulnerability Exploits, In ACM SIGCOMM, Aug. 2004.

Xu, J., Ning, P., Kil, C., Zhai, Y., and Bookholt, C., Automatic Diagnosis and Response to Memory Corruption Vulnerabilities, In Proceedings of the 12th ACM Conference on Computer and Communications Security (CCS), Nov. 2005.

* cited by examiner

METHODS, SYSTEMS AND MEDIA FOR SOFTWARE SELF-HEALING

CROSS-REFERENCE TO RELATED APPLICATIONS

This application claims priority from U.S. Provisional Patent Application No. 60/792,460, filed on Apr. 17, 2006, and U.S. Provisional Patent Application No. 60/810,033, filed on May 31, 2006, which are hereby incorporated by reference herein in their entireties. This application is also related to U.S. patent application Ser. No. 11/584,451, filed on Oct. 20, 2006, which is hereby incorporated by reference herein in its entirety.

STATEMENT REGARDING FEDERALLY SPONSORED RESEARCH OR DEVELOPMENT

The government may have certain rights in the present invention pursuant to Army Research Office (ARO)/Department of Homeland Security (DHS) contract DA W911NF-04-01-0442.

TECHNOLOGY AREA

The disclosed subject matter relates to methods, systems, and media for providing self-healing capabilities to software.

BACKGROUND

Software programming errors, often referred to as "bugs," often cause software applications to exhibit unintended behavior, to crash, and/or to be vulnerable to security threats or attacks. To make software applications as dependable as possible, software developers can apply a number of proactive approaches. For example, various diligent software development strategies, dynamic bug finders, and static analysis tools can be utilized to discover and eliminate bugs.

However, due to the complexity of many software applications, it is virtually impossible to eliminate all bugs in these applications using conventional approaches. Once a software application that contains bugs is deployed, various faults can occur under certain conditions. For example, a server application may crash upon receiving certain inputs, resulting in denial-of-service to clients until the server can be restarted, which may take a considerable amount of time. As a result, conventional techniques that deal with software errors are often unsatisfactory, especially when high performance and high availability is required.

Therefore, a reactive and automated approach for dealing with software errors is desirable. In particular, it is desirable to enable a software application to self-heal during execution.

SUMMARY

Embodiments of the disclosed subject matter provide methods, systems, and media for enabling a software application to recover from a fault condition. A method can include detecting a fault condition during execution of the software application, restoring execution of the software application to a previous point of execution, the previous point of execution occurring during execution of a first subroutine in the software application, and forcing the first subroutine to forego further execution and return to a caller of the first subroutine.

In some embodiments, computer-readable media are provided containing computer-executable instructions that, when executed by a processor, cause the processor to perform a method for enabling a software application to recover from a fault condition. The method can include detecting a fault condition during execution of the software application, restoring execution of the software application to a previous point of execution, the previous point of execution occurring during execution of a first subroutine in the software application, and forcing the first subroutine to forego further execution and return to a caller of the first subroutine.

In some embodiments, methods for protecting a software application from a fault condition are provided. A method can include executing the software application, recording at least one return value of at least one subroutine in the software application and calling context information associated with each value, and detecting a fault condition during execution of the at least one subroutine. The method can also include replacing the subroutine with instructions for determining a return value based on the calling context of the subroutine, the recorded at least one return value, and calling context information associated with the at least one return value, and instructions for returning the determined return value to the caller of the subroutine.

In some embodiments, computer-readable media are provided containing computer-executable instructions that, when executed by a processor, cause the processor to perform a method for protecting a software application from a fault condition. The method can include executing the software application, recording at least one return value of at least one subroutine in the software application and calling context information associated with each value, and detecting a fault condition during execution of the at least one subroutine. The method can also include replacing the subroutine with instructions for determining a return value based on the calling context of the subroutine, the recorded at least one return value, and calling context information associated with the at least one return value, and instructions for returning the determined return value to the caller of the subroutine.

DETAILED DESCRIPTION

According to various embodiments, methods, systems, and media are provided for enabling a software application (e.g., a server application) to recover from fault conditions. In some embodiments, fault monitors can be used to detect various fault conditions during execution of the software application. Upon detecting a fault condition, which may cause the software application to crash, the execution of the software application can be halted and restored to a previous point of execution. This previous point of execution is herein referred to as a "rescue point". In addition, a subroutine (or function) that is being executed at the previous point of execution can be forced to forego further execution and immediately return to a caller of the subroutine. An appropriate error value can also be selected and returned to the caller. This may enable the software application to avoid executing instructions that would cause the application to crash. In this way, the software application can recover from fault conditions and continue to execute. An appropriate return value can also be used to cleanup computational side effects of the aborted subroutine by use of the underlying source code.

Figure 1:
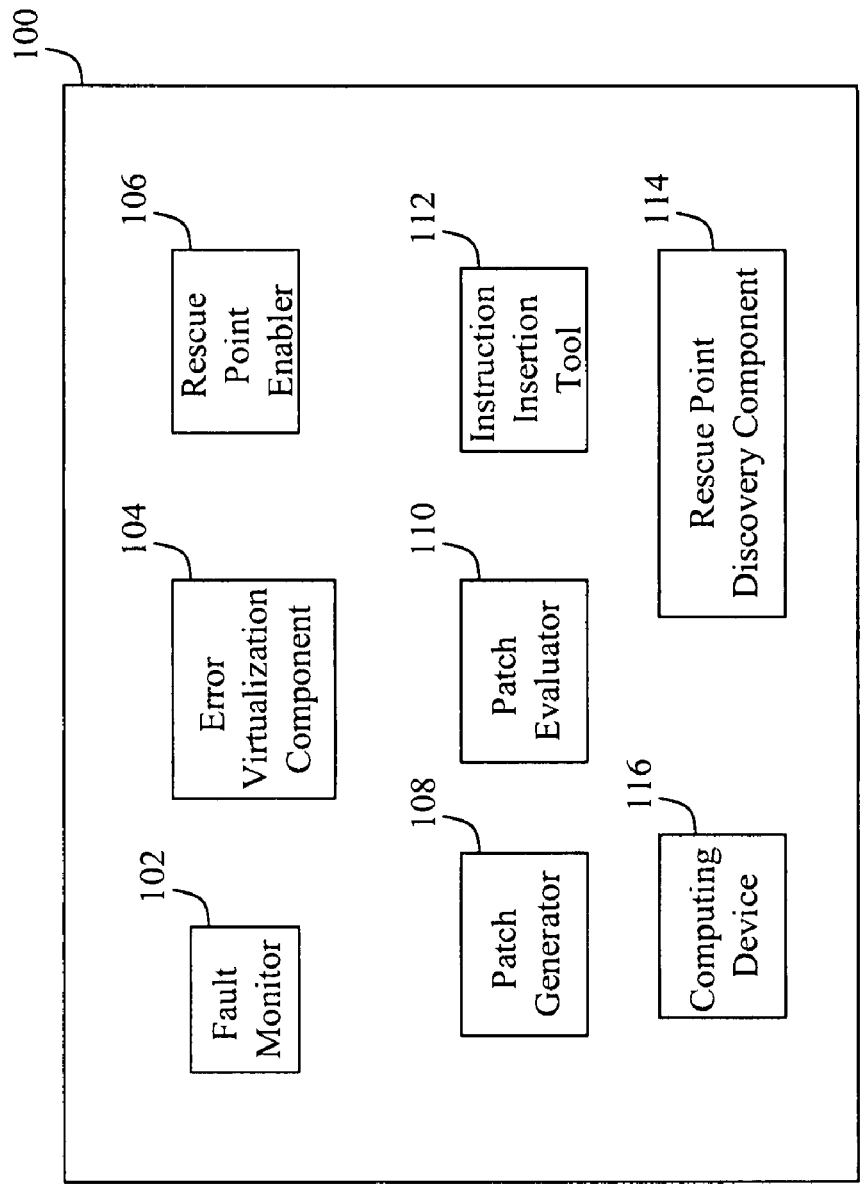
FIG. 1 is a diagram illustrating a system according to some embodiments.

FIG. 1 is a diagram illustrating a system 100 for enabling a software application (not shown) to recover execution from fault conditions. System 100 can include various components such as a computing device 116, a fault monitor 102, an error virtualization component 104, a rescue point enabler 106, a patch generator 108, a patch evaluator 110, an instruction insertion tool 112, and a rescue point discovery component 114. Fault monitor 102, error virtualization component 104, rescue point enabler 106, patch generator 108, patch evaluator 110, instruction insertion tool 112, and/or rescue point discovery component 114 may each be implemented in software and executed on computing device 116.

Rescue point discovery component 114 can be used to determine one or more candidate rescue points within the software application, and to select rescue points from the candidate rescue points when faults are detected. Determination of candidate rescue points can be performed off-line. Suitable rescue points can be program locations where an error is propagated. Because an immediate return of an error value at these program locations is already contemplated by the programmer of the software application, restoring execution of the software application to these program locations and forcing a return will not likely cause the software application to go down an unexpected execution path.

As an example, in Code Listing A below,

```
int func( )
{
    int error = -1;
    int ret;
    char buf[80];
    ret = get_string(buf);
    if (ret == error) return error;
    string_operation(buf);
    return 1;
}
``` the "if . . . return . . . " statements are intended to propagate an error, and therefore can be determined as a candidate rescue point. When a fault is detected, restoring application execution to this candidate rescue point and forcing a return would cause the subroutine func( ) to forego execution of string_operation( ), as if subroutine get_string( ) returned an error. In this manner, the detected fault is mapped to an error that is explicitly handled by the "if . . . return . . . " statement in Code Listing A. It should be noted that although the code listing is written in the C programming language, embodiments of the present invention can be used for software written in any programming language.

In some embodiments, rescue point discovery component 114 can utilize dynamic analysis techniques to determine suitable rescue points in the software application. This can be performed by analyzing application behavior when the application is subjected to known "bad inputs" or stress testing. A "bad input" is an input that can cause an error in the software application. By analyzing how the software application responds to bad inputs, e.g., by examining call graphs relating to the execution of the software application, and by analyzing subroutine arguments and return types and values, rescue point discovery component 114 can determine how errors are normally propagated. Based on that determination, candidate rescue points can be determined. In one embodiment, candidate rescue points can be selected from subroutines with non-pointer return types, or subroutines that return NULL pointers.

To obtain call graphs, subroutine argument types and values, and return types and values, the software application can be modified by inserting monitoring instructions at every subroutine's entry, exit, and call site points. The inserted monitoring instructions can then provide a trace when the software application is executed. From this trace, call graphs can be extracted. Other information such as subroutine argument types and values, return types and values, subroutine call sites, subroutine control flow graphs can also be obtained. These information can then be used to determine candidate rescue points, and appropriate error return values to be used when the application is rolled back to the rescue point. In one embodiment, the monitoring instructions, which may be in binary form, can be injected into the software application during application runtime, for example, using the dynisnt tool described below. However, any other suitable modification techniques can be used.

After the software application is deployed and when a fault is detected, rescue point discovery component 114 can further be used to select a previously determined candidate rescue point to which application execution can be restored. In some embodiments, for example, using a suitable fault detection technique, the name of the subroutine where the fault occurred can be extracted, and the call stack information of the subroutine can be obtained. If there is an overlap between the subroutine's call stack and the call graph obtained when the software application was previously tested with bad inputs, a candidate rescue point can be selected within the overlap. When there is no overlap, other techniques for selecting a rescue point can be used. For example, if there is a programmer-annotated candidate rescue point, that rescue point can be selected. Any other suitable techniques may also be used for selecting rescue points. For example, the call stack of the subroutine can also be iterated until a suitable rescue point is selected.

Alternatively, rescue point discovery component 114 can utilize various static analysis techniques to determine candidate rescue points and appropriate error return values to be used for a forced return. For example, the caller of a vulnerable subroutine can be analyzed to examine how the return value of the subroutine is used in the caller. If a subroutine return value is used in a control flow statement followed by an exit statement (e.g., the "if" and "return" statements in Code Listing A), the exit statement may be identified as a candidate rescue point, and the return value used in the exit statement can be determined as an appropriate error return value for use in a forced return.

As another example, subroutines can be ranked according to their potential as candidate rescue points, based on the frequency and type of Input/Output (I/O) operations, use of global variables, and presence of signal handling codes. To analyze the software application, source code transformation tools can be used to process the software application. For example, a Tree Transformation Language (TXL) transformation system can be used to generate an TXL intermediate representation of pre-processed C code, which can be presented in the Extensible Markup Language (XML) format. In addition, rescue point discovery component 114 can use static analysis techniques in conjunction with dynamic analysis techniques to determine candidate rescue points, and to select rescue points and appropriate error return values after deployment.

After candidate rescue points are determined, they can be enabled by rescue point enabler 106. Enabler 106 can employ a checkpoint-restart mechanism, which can save a running software application at a given point in time such that it can be restored at a later time in the same state in which it was saved. A "checkpoint" in this document refers to the act of saving the running software application, which includes storing the application execution state. Enabler 106 can enable a candidate rescue point by performing a checkpoint when the candidate rescue point is reached during execution. Instructions for capturing and saving the application execution state can be inserted into the application at the candidate rescue point prior to or during the execution of the application. Application execution states associated with checkpoints can be kept in memory using standard copy-on-write semantics, and can be indexed by their corresponding identifiers.

Once a candidate rescue point is enabled, the software application can be restarted by enabler 106 at a later time using the saved state information associated with the candidate rescue point. Restarting an application using previously saved state information effectively brings the execution of the application back to the previous point in time when the state information was saved, undoing all the execution after the previous point in time.

In some embodiments, the software application can be encapsulated in a virtualized operating system environment that decouples the software application from the underlying operating system instance. The virtualized operating system environment provides the application with private virtual namespaces that ensure that the operating system environment remains the same even if system resources in the underlying operating system have been remapped. The virtualized operating system environment can be provided using a loadable kernel module requiring no modification to the application, libraries, or the operating system.

A software application can include multiple processes and/or threads that share resources. The software application may require that the multiple processes and/or threads agree on the properties of the shared resources at any given time. In performing a checkpoint of the software application, checkpoints of the different processes and/or threads can be performed in a coordinated manner to ensure global consistency. When a process reaches a rescue point, it can wait until the remaining processes also reach one, and then the checkpoints can be performed synchronously. If other processes are blocked on I/O, signals can be used to force them out of blocking calls. To minimize the time needed for synchronization, multiple candidate rescue points can be enabled in the application to increase the chance of reaching one at any given time. Some of these rescue points can be marked as optional and used only if a checkpoint of the software application is pending due to synchronization. If the processes and/or threads in the software application are independent, checkpoints can be performed for each of the processes and/or threads independent of one another without the need for synchronization.

Fault monitor 102 can include any number of sensors (which can be implemented in software) that continuously monitor the execution of the software application to detect fault conditions. A fault condition can be, for example, a memory violation such as buffer overflow or underflow, a denial-of-service attack, a violation of an underlying security policy, and/or any other types of fault conditions. Any suitable fault detection techniques may be used.

In some embodiments, fault detection can be achieved by replacing program instructions that may cause a fault condition with emulated instructions. Emulated instructions can be created using an emulator, e.g., the Selective Transactional Emulation (STEM) tool. STEM is an instruction level emulator that can be selectively invoked for arbitrary segments of code. STEM permits execution of emulated and non-emulated code within the same process. STEM can be implemented as a C library that defines special tags (a combination of macros and function calls) that mark the beginning and end of emulation. To use STEM, the application source code can be transformed to insert the STEM emulator tags around code that needs to be replaced. As an example, Code Listing B below shows STEM emulator tags wrapping a code segment to be emulated:

```
void foo(int position) {
    ...
    emulate_init( );
    emulate_begin(stemp_args);
    table[position];
    emulate_end( );
    emulate_term( );
    ...
}
```

After the application source code is compiled, a binary code insertion tool can be used to replace instructions wrapped by the emulator tags with emulated instructions. The emulated instruction can incorporate various sensors for detecting fault conditions, such as memory violations and denial-of-service attacks. For example, a mechanism for detecting high-level algorithmic-complexity denial-of-service attacks can be implemented.

As another example, the Dynamic Buffer Overflow Containment (DYBOC) tool can be used to protect applications against memory violations such as buffer overflows or underflows. DYBOC uses source-to-source transformations to create a moat around protected buffers. When a buffer overflow or underflow occurs, DYBOC can raise a signal.

When applying protection mechanisms to an application, the scope of protection can be adjusted. For example, if the application is protected using DYBOC, protection may be limited to only the buffer that was exploited by a fault. If the application is protected using STEM, the subroutine where the fault manifested can first be determined, and then the basic blocks of the subroutine can be extracted. These blocks can be iteratively protected, and by supplying the application with the input that caused the fault, the block in which the fault manifested can be determined, and a patch protecting that block can be applied to the application. Finer granularity of protection can also be used. For example, protection can be limited to each basic block or individual statement in a subroutine. Limiting the scope of protection can enhance performance for the protected application.

Once a fault is detected, the location of the fault can be determined by examining the call stack. A candidate rescue point can also be selected, for example, by rescue point discovery component 114 described above. Patch generator 108 can be used to produce a patch (e.g., a group of instructions). The patch can be applied to the application at the selected rescue point. For example, instruction insertion tool 112 can be used to insert the patch in the application at the selected rescue point.

At this point, rescue point enabler 106 can restore the state of the application to the selected rescue point, and the patch can force the subroutine associated with the rescue point to forego further execution and return immediately, possibly with an appropriate error value determined by error virtualization component 104. Error virtualization component 104 can determine the return value by analyzing the return values of the subroutine during execution. For example, the most frequently observed return value of the subroutine can be chosen for the patch. Static analysis of the subroutine code can also be used for determining the appropriate error return value.

As an example, Code Listing C below includes a patch that forces an error return at a rescue point (subroutine rescue_point( )):

```
int rescue_point( int a, int b) {
    int ret= rescue_capture(id, fault);
    if (ret < 0)
        handle_error(id); /* restore error */
    else if (ret == 0)
        return get_rescue_return_value(fault);
    /* all ok */
    ...
}
```

Subroutine get_rescue_return_value( ) can be used to determine an error value to be returned to the caller of the rescue_point( ) subroutine.

In addition, patch evaluator 110 can be used to determine whether the patch allows the software application to recover from the detected fault condition. To make this determination, the restarted application is supplied with an input that caused the fault to manifest. If the offending input cannot be easily identified, a group of most recent inputs can be used. If the fault condition can no longer be detected after the patch is applied, the software application can be deemed to have recovered from the fault. If the fault condition can still be detected, another rescue point can be selected, and a new patch can be generated and tested.

Figure 2:
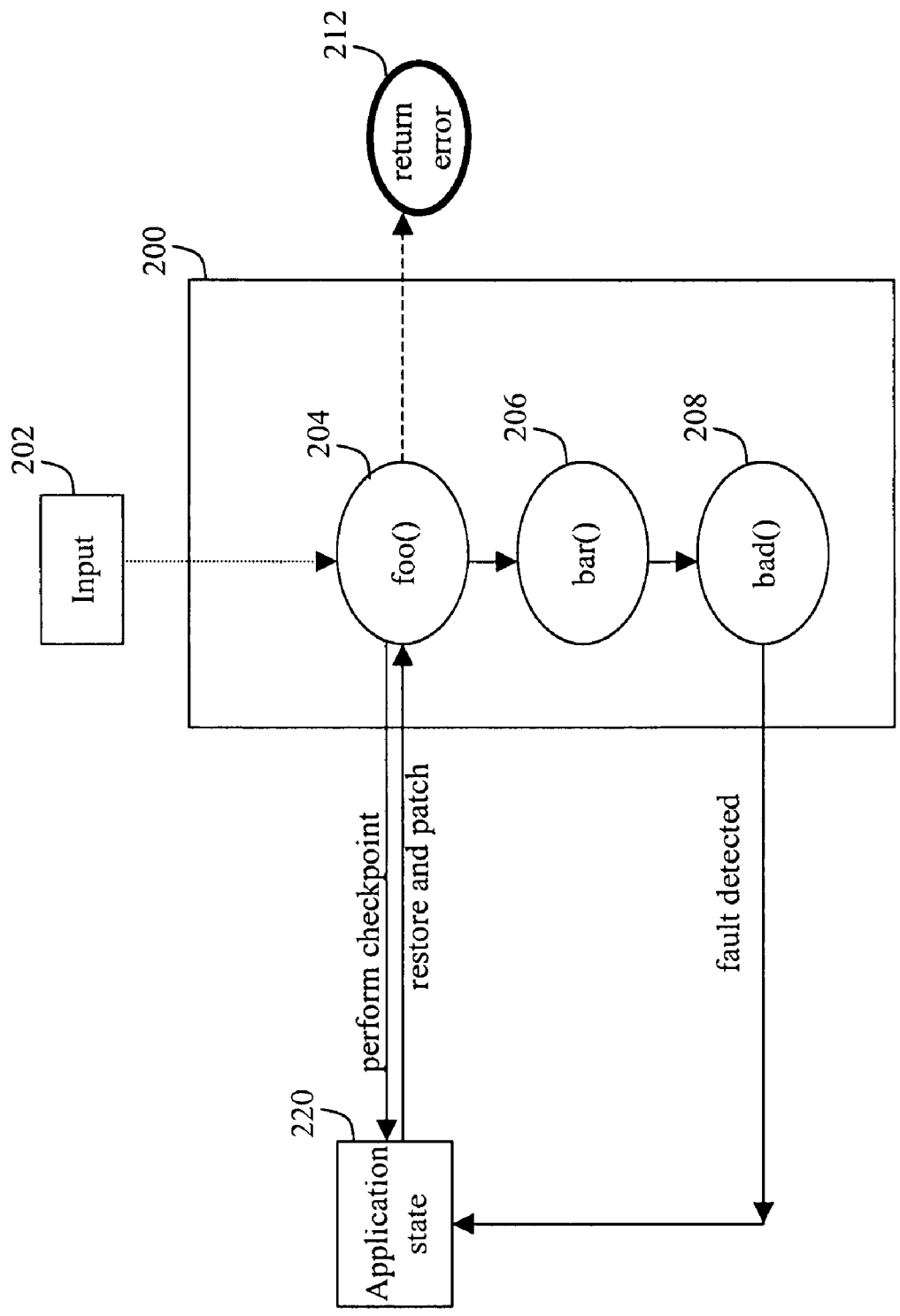
FIG. 2 is a diagram illustrating an example of operations performed by the system illustrated in FIG. 1.

FIG. 2 is a diagram illustrating an example of various operations performed by system 100. As shown, a software application 200 includes a subroutine foo( ) 204, which calls a subroutine bar( ) 206, which in turn calls a subroutine bad( ) 208. Application 200 is supplied with an input 202. Subroutine 204 is a candidate rescue point. Therefore, when subroutine 204 is executed, a checkpoint can be performed, and an application state 220 can be saved. When subroutine 208 is executed, a fault is detected. Using saved application state 220, execution of software application 200 can be restored to the rescue point of subroutine 204. Subroutine 204 is also patched, so that it returns an error value at 212 immediately, instead of continuing execution to reach subroutines 206 and 208.

Figure 3:
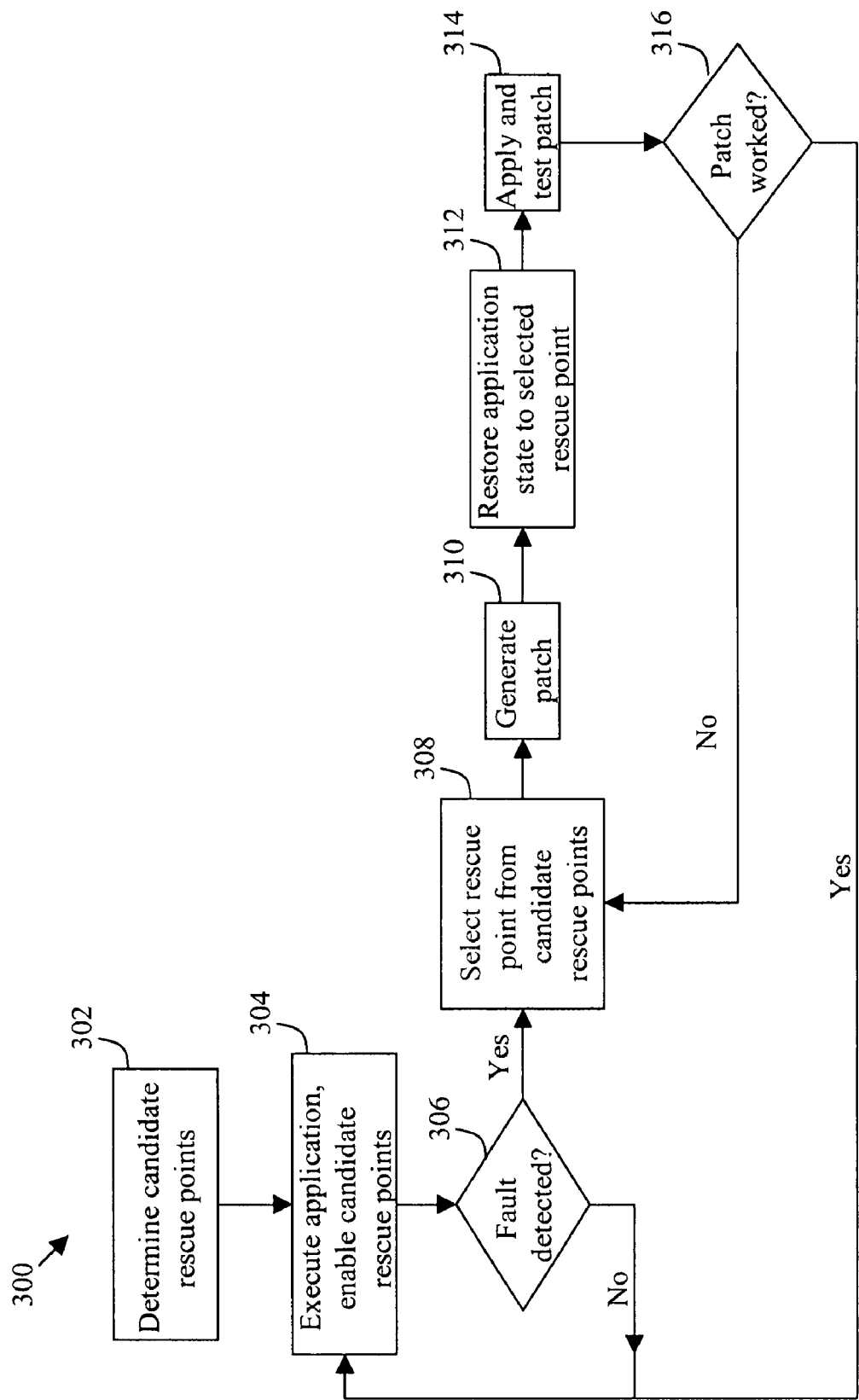
FIG. 3 is a diagram illustrating a method for enabling a software application to recover from a fault condition according to some embodiments.

FIG. 3 is a diagram illustrating a method 300 of various embodiments. At 302, method 300 can determine candidate rescue points for a software application. At 304, the software application starts to execute, and when candidate rescue points are reached, they can be enabled by performing checkpoints using, e.g., rescue point enabler 106 shown in FIG. 1. At 306, method 300 can determine whether a fault condition has been detected. If not, the software application continues to execute at 304. If a fault condition is detected at 306, a rescue point is selected at 308, from candidate rescue points that are enabled at 304. At 310, a patch can be generated. At 312, execution of the software application can be rolled back to the selected rescue point. At 314, the patch generated at 310 can be applied to the software application and tested. At 316, if it is determined that the patch enabled the software application to recover from the fault detected at 306, the application continues to execute at 304. If the patch does not work, 308, 310, 312, and 314 are repeated, until the software can recover from the fault.

In some embodiments, using the incremental checkpoint capabilities, attacks delivered in multiple stages to a software application can be detected. In these embodiments, when a fault is detected, instead of selecting the latest enabled rescue point n to restore to, a rescue point n−random (1 . . . n) can be selected, such that more than one input have been applied to the application from the time when the selected rescue point was enable. By restoring application execution to this selected rescue point, application execution state changes that are caused by more than one input are undone. At this point, a patch can be applied to the software application and the input that caused the fault condition can be replayed. If the fault occurs again at the same location, the fault is deterministic and does not depend on specific application state to manifest. If the fault does not occur, the fault depends on specific application state to manifest, and can be caused by a multi-stage attack. In this case, the application can be examined for semantic bugs using user-supplied tests, to ensure semantic correctness of the generated patch. For example, an online vendor can run tests that make sure that client orders can be submitted and processed by the application.

In FIG. 1, various components of system 100 utilize instruction insertion tool 112 to modify the software application prior to or during application runtime. Instruction insertion tool 112 can use source-to-source transformation techniques to modify the source code of software applications. Instruction insertion tool 112 can also use any suitable techniques to modify the software application binary. In some embodiments, binary translation tools (e.g., the ATOM tool) can be used to add instructions to a compiled binary. Runtime instrumentation tools such as PIN can be used to instrument the application binary just prior to execution. In addition, runtime code injection tools, such as Dyninst, can be used to modify application binary at runtime by inserting jumps to helper subroutines.

Figure 4:
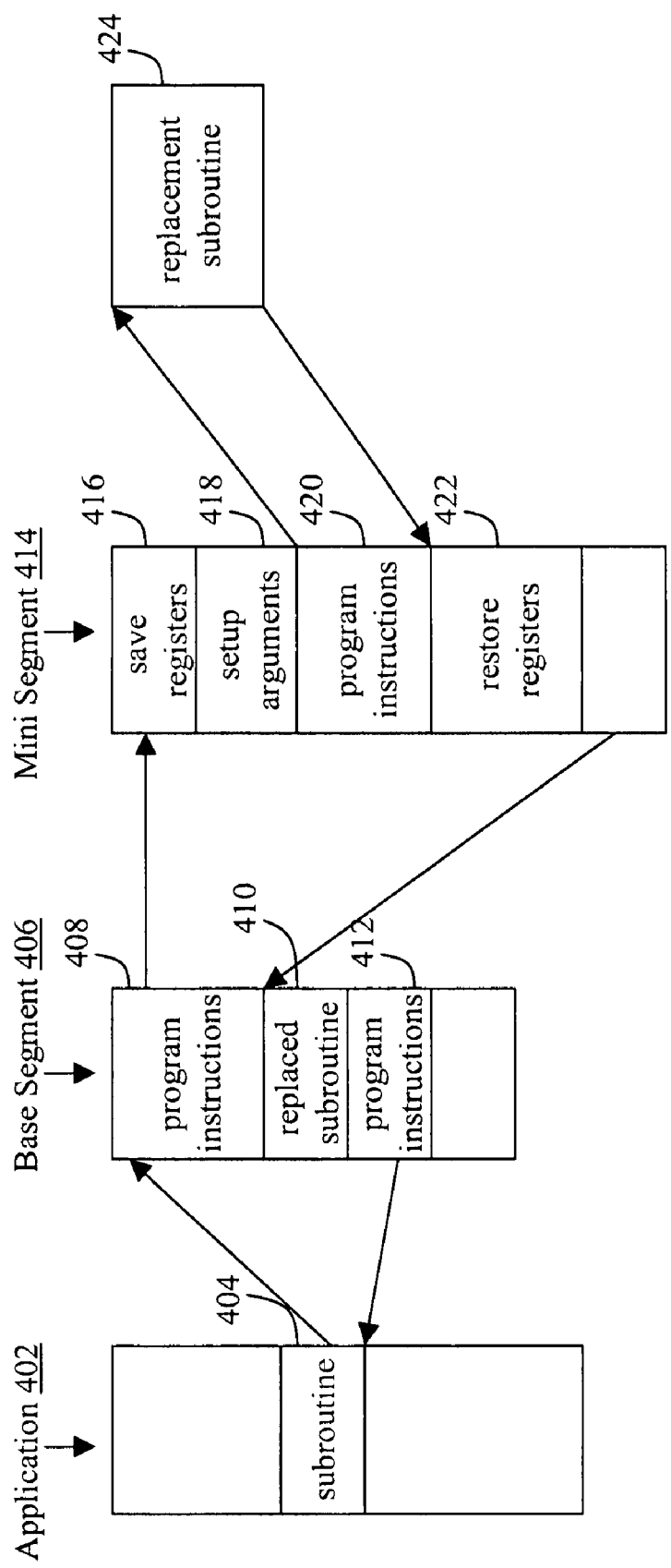
FIG. 4 is a diagram illustrating an example of software runtime instruction insertion according to some embodiments.

FIG. 4 is a diagram illustrating the modification of an application using the Dyninst tool. As shown, an application 402 originally includes a subroutine 404, which can be replaced using the Dyninst tool with a jump to a base segment 406. Base segment 406 can include a space 410 for storing instructions in the replaced subroutine 404. Base segment 406 can also include other program instructions 408, 412. During execution, base segment 406 can jump to a mini-segment 414. Mini-segment 414 can include program instructions 420 created using Dyninst. Alternatively, mini-segment 414 can call a replacement subroutine 424, which can include, for example, code for detecting a fault condition. To call replacement subroutine 424, mini-segment 414 can include instructions for saving registers 416, instructions for setting up arguments 418, and instructions for restoring registers 422.

Patches can be inserted into an application binary. For example, a software application can be protected using both STEM and DYBOC through source-to-source transformations. The protected version can then be transformed into a shared library, which can subsequently be used to replace unprotected functions. For example, if a vulnerability has been detected in subroutinefoo( ), it can be replaced with a version of foo( ) that is surrounded by STEM emulation tags.

If the patch passed all assigned tests, the production version of the software application can be updated so that every time foo( ) is invoked, the protected version would be used.

In some embodiments, system 100 can be deployed in a "honeypot" deployment scenario as described in S. Sidiroglou and A. D. Keromytis, A Network Worm Vaccine Architecture, *Proceedings of the IEEE Workshop on Enterprise Technologies: Infrastructure for Collaborative Enterprises (WETICE), Workshop on Enterprise Security*, pages 220-225, June 2003, and S. Sidiroglou, M. E. Locasto, S. W. Boyd, and A. D. Keromytis, *Building a Reactive Immune System For Software Services, Proceedings of the USENIX Technical Conference*, April 2005. In this scenario, instances (or copies) of an application to be protected are deployed as honeypot nodes, which can wait for malicious attacks or can have traffic from a monitored network mirrored to them. Because these honeypot nodes are not expected to service user requests, performances issues of the honeypot nodes are of less concern. Once a fault is detected at a honeypot node, a patch can be generated locally and tested at the honeypot node. Once a patch passes a test, it can be applied to a production version of the software application that serves user requests.

In some embodiments, system 100 can be deployed in a "shadow honeypot" deployment scenario, as described by K. Anagnostakis, S. Sidiroglou, P. Akritidis, K. Xinidis, E. Markatos, and A. D. Keromytis, Detecting Targetted Attacks using Shadow Honeypots, Proceedings of the 14$^{th}$ USENIX Security Symposium, pages 129-144, August 2005. A shadow honeypot, which is also an instance of an application to be protected, can share state with a production version of the protected application, and can therefore be used to detect targeted attacks against the application. This approach can be used to thwart-attacks that try to exploit application-specific state. Using shadow honeypots, the application need to set up a rescue point when an anomalous request is detected.

Alternatively, fault monitoring can be spread across a number of hosts using an Application Community (AC) deployment scenario, described in M. E. Locasto, S. Sidiroglou, and A. D. Keromytis, Software Self-healing Using Collaborative Application Communities, NDSS, the Internet Society, 2006. An AC can be a collection of almost-identical instances of the same application running autonomously across a wide area network. Members of an AC can collaborate in identifying previously unknown flaws/attacks and exchange information so that failures can be prevented from re-occurring.

Figure 5:
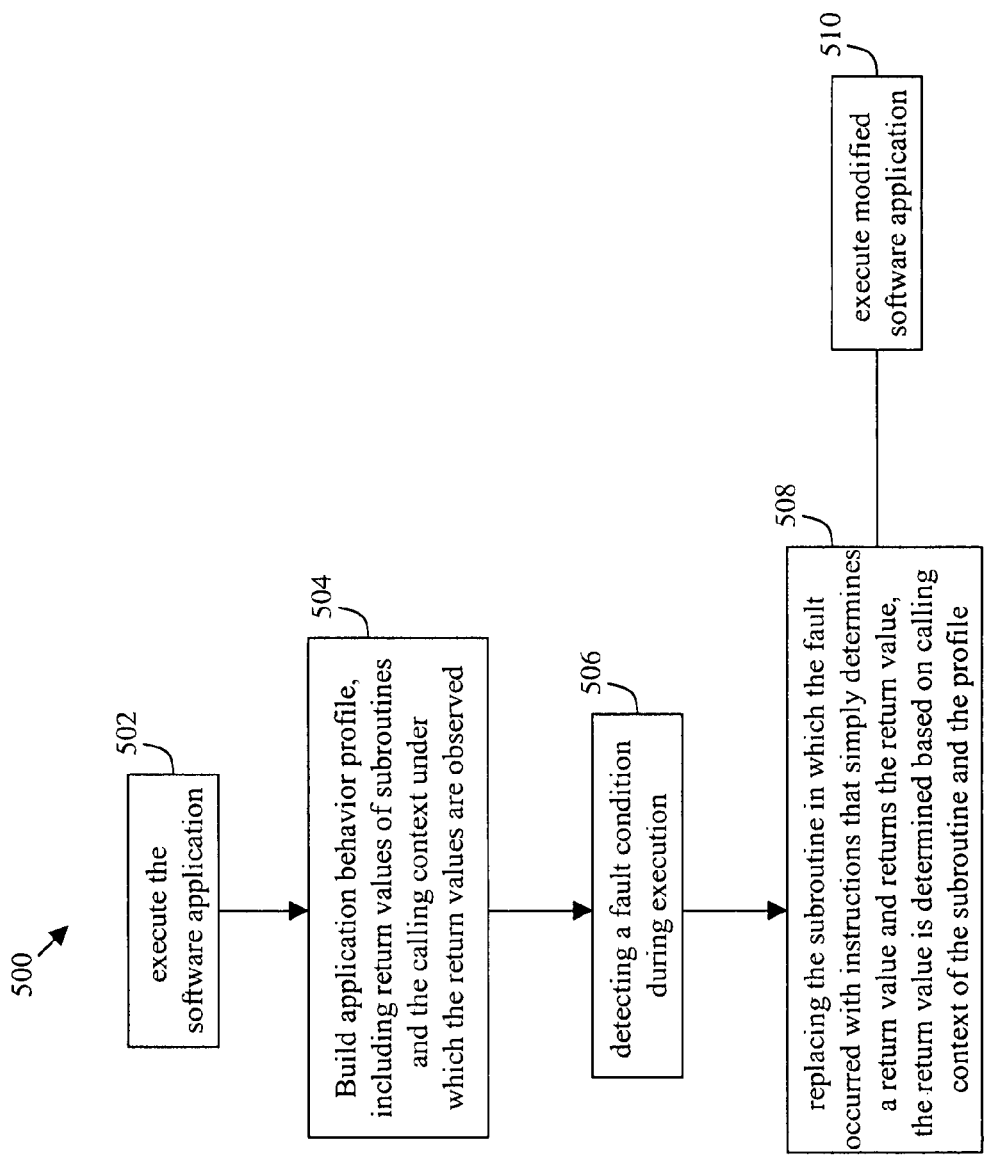
FIG. 5 is a diagram illustrating a method for protecting a software application from a fault condition according to some embodiments.

FIG. 5 is a diagram illustrating a method 500 for protecting a software application from a fault condition. At 502, the software application is executed. At 504, an application behavior profile can be built. The profile can include observed return values of subroutines in the application, and the calling context associated with the observed return values. At 506, a fault condition is detected, using, for example, the STEM tool. At 508, the subroutine in which the fault occurred can be modified. The modified subroutine can include instructions for determining a return value based on the current calling context of the subroutine and the profile that is created in 504. At 510, the modified software application is executed. When the modified subroutine is called, the subroutine can determine a return value and return immediately, avoiding instructions that may cause the fault condition.

To obtain subroutine return values and calling context information, the software can be modified to produce an execution trace when executed. For example, open-source binary instrumentation framework Valgrind can be used for this purpose. The trace can include subroutine return types and values, argument values and types passed to the subroutines, sequences of subroutine calls, and any other information relating to the calling context of the subroutines. The trace can then be used to build an application behavior profile. Using Valgrind, program behavior can be extracted dynamically from the execution of the application binary without altering the source code, modifying the compiler, or altering the operating system.

In some embodiments, an application behavior profile can include a list of elements, each element including calling context information such as: 1) identifiers of a list of subroutines $\{f0, f1, f2 \ldots, fn\}$, which can be the subroutine names, addresses, and/or call sites of the subroutines, 2) profile feature, which indicates the relationships between the subroutines in the list, and 3) context window size n. Profile feature can be FLAT, indicating a null calling context, or PARENT, indicating that each of the subroutines in the list is a parent of the preceding subroutine in the list. Profile feature can also be SIBLING, indicating that each of the subroutines in the list is a sibling of the preceding subroutine in the list, or MIX, indicating that a mixture of parents and siblings are present.

Figure 6:
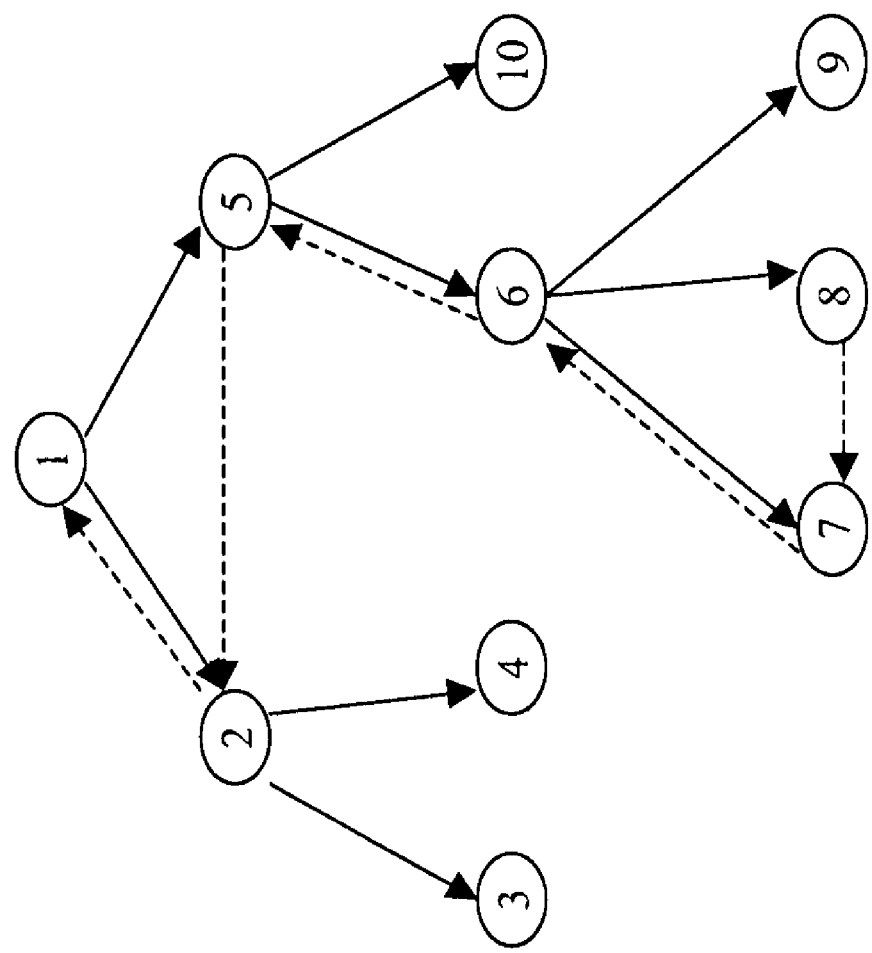
FIG. 6 is a diagram illustrating an example of a subroutine call graph.

As an example, an element of the application behavior profile can be constructed by traversing a call graph of the application. FIG. 6 represents a subroutine call graph that includes subroutines 1 to 10. If profile feature MIX is used, and subroutine 8 is selected as the starting point, the call graph can be traversed to previous sibling subroutine 7. Because subroutine 7 does not have a previous sibling, the call graph can be traversed to parent subroutine 6. Traversal of the call graph is indicated in FIG. 6 by the dashed arrows. This call graph traversal algorithm can be recursively repeated, to further include subroutines 5, 2, and 1, until the root of the call graph or the window size is reached. In this example, a profile element with context window size 5 can be constructed to include a list of identifiers of subroutines 7, 6, 5, 2, and 1, respectively. In this manner, an element of the profile can uniquely identify the calling context of a subroutine during the execution of the software application.

To build the profile, for each profile element, observed return values can be stored. For a subroutine in the software application, based on the stored profile elements and corresponding return values, a predictive model can be determined. For example, a predictive model can be determined by estimating conditional probabilities of return values for the subroutine (that is conditional upon the calling context of the subroutine).

If a fault is detected when the subroutine is executed, the subroutine can be replaced with instructions that "predict" a return value, e.g., by using a predictive model, and immediately return the "predicted" return value to the caller. For future calls to the subroutine, the replaced subroutine can obtain the calling context of the subroutine. The calling context can be constructed, for example, in the same format as application behavior profile elements, and can be varied by changing the window size. The calling context with different window sizes can then be matched against elements of the application behavior profile, and the previously determined predictive model can be used for selecting a return value that corresponds to the calling context. The replaced subroutine can then return the return value, skipping the instructions that may cause the fault condition. In some embodiments, static analysis can also be used to predict return values.

For example, suppose that the subroutine can return either 1, 2, or 0, and that for a particular calling context A, the probability of the subroutine returning 1 is calculated to be 0.8, and the probability of the subroutine returning 2 or 0 is calculated to be 0.1 respectively. Then, for a future call to the subroutine, if the calling context is A, then we can "predict" that the subroutine will return 1, and can force the subroutine to return 1.

In some embodiments, the predictability of return values can be determined. For example, a window size of 1 can be selected first, and all calling contexts with window size 1 that lead to single return values for the subroutine under consideration can be examined. For those contexts and their corresponding return values, a conditional probability can be calculated, which can then be added to a prediction score. Then, the window size can be incremented to higher levels iteratively, and prediction score updated. A context that has lead to single return values will not be considered in the next level, because it does not provide additional information in the next level.

Calling context information of an application behavior profile can include information relating to application calls, library calls, and/or system calls. In some embodiments, when building a profile, operating system kernels can be protected using system call interposition and/or virtual-machine monitors. The building of the application behavior profile can be performed while the application is deployed, detecting faults, and performing self-healing. Alternatively, the building of the profile can be performed off-line. For example, the list of return values associated with different calling contexts of various subroutines can be recorded and saved during a previous run of the software application, which can be used to build a profile before the application restarts.

In selecting a return value, various scheduling techniques can be used. For example, the first observed return value for a particular calling context may be used. As another example, a round-robin First-In-First-Out (FIFO) strategy or a delayed round-robin strategy can be used to iterate through all observed values. Alternatively, return values can be rank-ordered by priority. For instance, if a particular calling context seen during training closely matches the current calling context, the observed return value corresponding to that particular calling context can receive a high priority. As another example, if function c( ) always returns "−1" when functions a( ) and b( ) proceed it on the call stack, and this configuration matches the call stack at the moment when fault is detected, then "−1" is a good candidate value.

In some embodiments, application behavior profile that results from the selection of a particular return value can be continuously evaluated and validated. For example, after the selection of a return value, the application behavior profile can be constructed and compared to an expected profile. If the two profiles do not match, a replacement return value can then be selected and evaluated. In some embodiments, by comparing an application behavior profile with an expected profile, deviations from normal application behavior can be detected.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for enabling a software application to recover from a fault condition, comprising:

replacing one or more instructions in the software application with one or more emulated instructions, wherein the one or more emulated instructions comprise instructions for detecting a fault condition;

detecting the fault condition during execution of the software application;

restoring execution of the software application to a previous point of execution, the previous point of execution occurring during execution of a first subroutine in the software application; and forcing the first subroutine to forego further execution and return to a caller of the first subroutine.

2. The method of claim 1, wherein, the software application is executed in a virtualized operating system environment.

3. The method of claim 1, further comprising:

determining one or more points of execution;

storing state information relating to execution of the software application upon reaching each of the determined one or more points of execution; and selecting the previous point of execution from the one or more determined points of execution, wherein the restoring is based on the stored state information.

4. The method of claim 3, wherein selecting the previous point of execution comprises comparing a call-stack of the software application when the fault condition is detected with a previously recorded call graph of the software application.

5. The method of claim 3, further comprising determining whether the software application has recovered from the fault condition after the restoring and the forcing.

6. The method of claim 5, further comprising repeating the selecting, the restoring, and the forcing, upon determining that the software application has not recovered from the fault condition.

7. The method of claim 1, wherein the fault condition comprises at least one of a memory violation, a denial-of-service attack, and a violation of a security policy.

8. The method of claim 1, wherein the forcing comprises modifying instructions of the software application to be executed during execution of the software application.

9. The method of claim 1, wherein the forcing further comprises determining an error value to be returned to the caller based on previous return values of the first subroutine during execution of the application.

10. A computer-readable medium containing computer-executable instructions that, when executed by a processor, cause the processor to perform a method for enabling a software application to recover from a fault condition, the method comprising:

replacing one or more instructions in the software application with one or more emulated instructions, wherein the one or more emulated instructions comprise instructions for detecting a fault condition;

detecting the fault condition during execution of the software application;

restoring execution of the software application to a previous point of execution, the previous point of execution occurring during execution of a first subroutine in the software application; and forcing the first subroutine to forego further execution and return to a caller of the first subroutine.

11. The medium of claim 10, wherein the software application is executed in a virtualized operating system environment.

12. The medium of claim 10, the method further comprising:
  determining one or more points of execution;
  storing state information relating to execution of the software application upon reaching each of the determined one or more points of execution; and
  selecting the previous point of execution from the one or more determined points of execution,
  wherein the restoring is based on the stored state information.

13. The medium of claim 12, wherein selecting the previous point of execution comprises comparing a call-stack of the software application when the fault condition is detected with a previously recorded call graph of the software application.

14. The medium of claim 12, the method further comprising determining whether the software application has recovered from the fault condition after the restoring and the forcing.

15. The medium of claim 14, the method further comprising repeating the selecting, the restoring, and the forcing, upon determining that the software application has not recovered from the fault condition.

16. The medium of claim 10, wherein the fault condition comprises at least one of a memory violation, a denial-of-service attack, and a violation of a security policy.

17. The medium of claim 10, wherein the forcing comprises modifying instructions of the software application to be executed during execution of the software application.

18. The medium of claim 10, wherein the forcing further comprises determining an error value to be returned to the caller based on previous return values of the first subroutine during execution of the application.

19. A system for enabling a software application to recover from a fault condition, the system comprising:
  means for replacing one or more instructions in the software application with one or more emulated instructions, wherein the one or more emulated instructions comprise instructions for detecting a fault condition;
  means for detecting the fault condition during execution of the software application;
  means for restoring execution of the software application to a previous point of execution, the previous point of execution occurring during execution of a first subroutine in the software application; and
  means for forcing the first subroutine to forego further execution and return to a caller of the first subroutine.

20. A method for protecting a software application from a fault condition, comprising:
  executing the software application;
  recording at least one return value of at least one subroutine in the software application and calling context information associated with each return value;
  detecting a fault condition during execution of the at least one subroutine; and
  replacing the subroutine with instructions for determining a first return value based on calling context of the subroutine and the recorded at least one return value and associated calling context information, and returning the determined first return value, wherein the first return value is determined based on a predictive model determined from the recorded at least one return value and associated calling context information.

21. The method of claim 20, wherein the predictive model is determined by estimating a conditional probability of the recorded at least one return value conditional upon the associated calling context information.

22. The method of claim 20, wherein the calling context information comprises information relating to one or more siblings of the at least one subroutine.

23. A computer-readable medium containing computer-executable instructions that, when executed by a processor, cause the processor to perform a method for protecting a software application from a fault condition, the method comprising:
  executing the software application;
  recording at least one return value of at least one subroutine in the software application and calling context information associated with each return value;
  detecting a fault condition during execution of the at least one subroutine; and
  replacing the subroutine with instructions for determining a first return value based on calling context of the subroutine and the recorded at least one return value and associated calling context information, and returning the determined first return value, wherein the first return value is determined based on a predictive model determined from the recorded at least one return value and associated calling context information.

24. The medium of claim 23, wherein the predictive model is determined by estimating a conditional probability of the recorded at least one return value conditional upon the associated calling context information.

25. The medium of claim 23, wherein the calling context information comprises information relating to one or more siblings of the at least one subroutine.

26. A system for protecting a software application from a fault condition, comprising:
  means for executing the software application;
  means for recording at least one return value of at least one subroutine in the software application and calling context information associated with each return value;
  means for detecting a fault condition during execution of the at least one subroutine; and
  means for replacing the subroutine with instructions for determining a first return value based on calling context of the subroutine and the recorded at least one return value and associated calling context information, and returning the determined first return value, wherein the first return value is determined based on a predictive model determined from the recorded at least one return value and associated calling context information.

* * * * *